No. 671,849. Patented Apr. 9, 1901.
W. F. WILLIAMS.
MEANS FOR SECURING ELASTIC TIRES TO WHEELS.
(Application filed Nov. 30, 1900.)
(No Model.) 2 Sheets—Sheet 1.
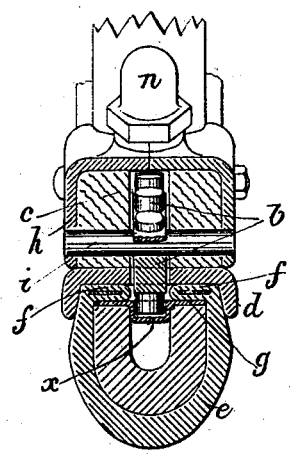
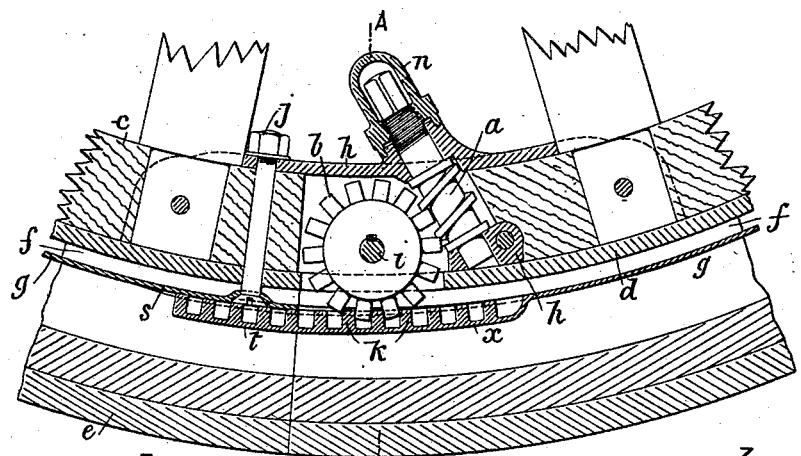
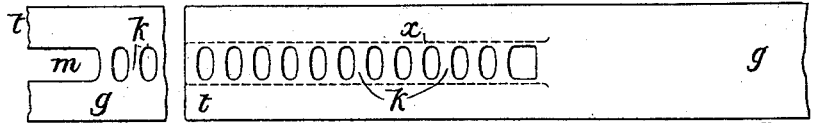
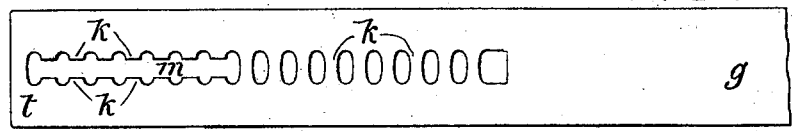

No. 671,849. Patented Apr. 9, 1901.
W. F. WILLIAMS.
MEANS FOR SECURING ELASTIC TIRES TO WHEELS.
(Application filed Nov. 30, 1900.)
(No Model.) 2 Sheets—Sheet 2.
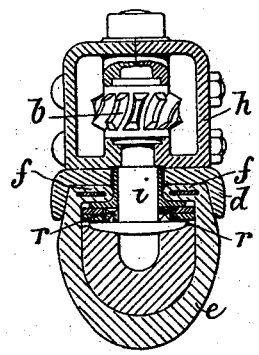
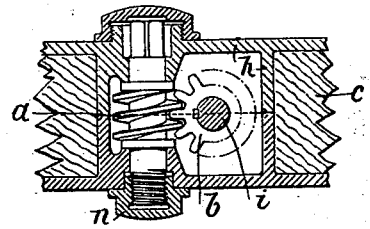
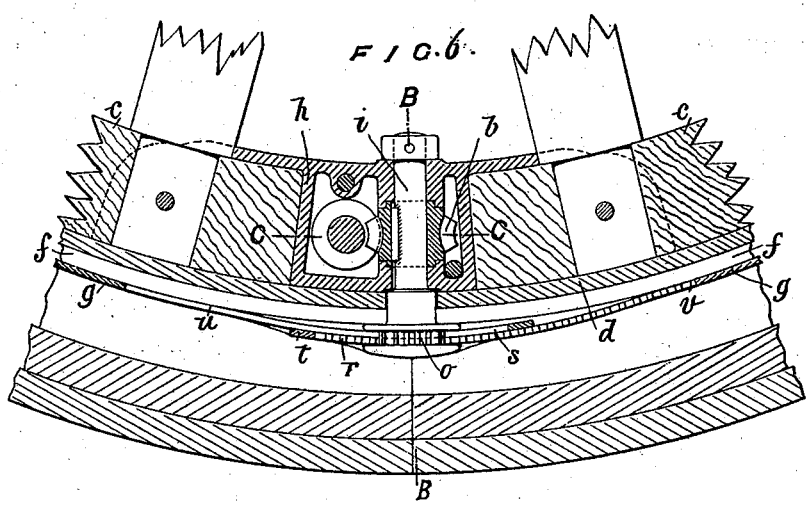
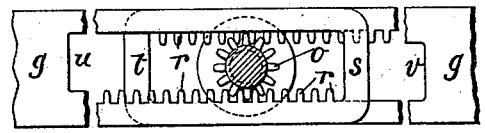

UNITED STATES PATENT OFFICE.

WILLIAM FREDERICK WILLIAMS, OF LONDON, ENGLAND.

MEANS FOR SECURING ELASTIC TIRES TO WHEELS.

SPECIFICATION forming part of Letters Patent No. 671,849, dated April 9, 1901.

Application filed November 30, 1900. Serial No. 38,235. (No model.)

*To all whom it may concern:*

Be it known that I, WILLIAM FREDERICK WILLIAMS, gentlemen, a subject of the Queen of Great Britain, residing at 17 and 18 Great Pulteney street, Golden Square, London, England, have invented new and useful Improvements in Securing Elastic Tires to Wheels, of which the following is a specification.

My invention relates to improved means of securing elastic tires to the rims of wheels, and has for its object to provide a simple and effective means whereby to enable the tire to be drawn so tightly around the rim of the wheel as to cause the ends to make a close butt-joint and to be so firmly secured as to render the displacement of the tire impossible.

The invention is applicable to elastic tires generally, whether provided or not with a removable outer cover. The means of attachment comprise inwardly-projecting flanges or wired edges on the tire or its cover which are received in the groove of the rim, a metal strip or strips adapted to engage with the said flanges and to encircle the wheel-rim, so that when drawn tightly in the circumferential direction to hold the tire securely in position in the groove of the rim, and means by which the tension may be applied to the said band or bands and maintained after the tire has been put on the wheel, so as to insure a close butt-joint of the ends of the tire and prevent creeping.

The invention consists, essentially, in the combination, with the said band or bands, of a worm and worm-wheel motion mounted in the felly of the wheel and adapted to engage either directly or indirectly with rack-teeth formed in the end or ends of the band.

Reference is to be had to the accompanying drawings, wherein—

Figure 1 is a sectional elevation taken in the plane of the wheel-rim, and Fig. 2 is a cross-section on line A A, Fig. 1, of one arrangement of worm-gear. Figs. 3, 4, and 5 are under side face views of various forms of the rack-toothed end of the band with which the worm-wheel engages. Fig. 6 is a sectional elevation taken in the plane of the wheel-rim, and Fig. 7 is a cross-section on line B B, Fig. 6, of another arrangement of worm-gear. Fig. 8 is a section on line C C, Fig. 6; and Fig. 9 is a face view of the rack-toothed ends of the band with which the pinion on the worm-wheel spindle gears.

The same letters of reference denote like parts in all the figures.

In all the figures, $a$ is the worm. $b$ is the worm-wheel in gear therewith.

$c$ is the felly of the wheel.

$d$ is the grooved wheel-rim, and $e$ is the elastic tire or its cover.

$f$ represents the inwardly-projecting flanges of the tire or its cover, lying in the groove of the rim $d$. $g$ is the band binding the said flanges $f$ against the bottom of the grooved rim $d$.

The worm $a$ and worm-wheel $b$ are mounted in a box $h$, let into the felly $c$ of the wheel, the spindle $i$ of the worm-wheel being either transverse or radial, according as the worm is to engage directly or indirectly with the rack-teeth of the band.

In the modification shown in Figs. 1 to 5 the one end $s$ of the band (assuming a single band to encircle the entire wheel) is made fast to the wheel-rim by a bolt or screw-stud $j$, which may either be shouldered to admit of the other end $t$ of the band sliding beneath it or may have a countersunk head, as shown in Fig. 1, to permit of the end $t$ sliding over the end $s$. In all cases the end $t$ of the band is rack-toothed, as at $k$, for engagement by the worm-wheel $b$, which is adapted to act also as a spur-wheel, engaging directly with the rack-teeth $k$ of the band, the worm-wheel being mounted on a transverse axis $i$ and projecting through a slot in the bottom of the grooved rim $d$, so as to engage with the rack-teeth $k$ of the band either by its worm-teeth, as in Figs. 1 and 2, or by rack-teeth projecting laterally from the rim of the wheel $b$. In cases where the end $t$ of the band slides beneath the opposite end $s$ or beneath the shoulders of the stud $j$ the end $t$ would be longitudinally slotted beyond the termination of the rack $k$, as at $m$, Fig. 5, so as to pass the stud $j$. The rack-teeth $k$ are formed by punching holes in the band, as shown in Fig. 4, and the rack-teeth may be continued along the edges of the longitudinal slot $m$ in the band, as in the same figure, or the rack may consist solely of teeth formed, as therein shown, along the edges of the slot $m$, this arrangement being especially applicable in cases where the worm-wheel b bears rack-teeth projecting laterally from its rim. In cases where the end t of the band g slides over the other end s the rack-teeth k may consist of transverse bars crossing a longitudinal groove or corrugation in the band, as in Figs. 1, 2, and 3, this arrangement serving to prevent weakening of the band consequent upon the diminution of its cross-sectional area caused by the holes which form the spaces between the teeth k in the band. In cases where, as in Figs. 1 and 2, the teeth of the worm-wheel b engage both with the worm a and also with the rack-teeth k of the band g it is preferred to make the teeth of the wheel b not of skewed form, as usual in worm-wheels, but with the transverse axes of the teeth parallel with the plane of the axis of the wheel, and in order to enable such teeth to gear with the worm a they are made elliptical or oval shape, as shown in Fig. 2. In either case the worm-wheel would act on only one end of the band, the other end either being fixed to the wheel-rim, as above described, or similarly acted on in the opposite direction by another worm-gear. Instead of the same band extending around the entire circumference it may be divided into parts, each embracing a portion of the circumference and each tightened up by a worm-and-rack gear, as above described. The worm-spindle is mounted in bearings in the box h and is shouldered so as to be incapable of longitudinal movement. In the arrangement above described the worm-spindle projects from the inner circumference of the wheel-felly and has a squared end for turning it by with the aid of a key. In order to prevent the slackening back of the worm-gear by jarring and the loosening of the tire, a lock-nut is provided in the form of a cap n, adapted to form a cover for the worm-spindle end and keyhole, said cap being threaded in such a direction as to prevent the slackening back of the worm a and screwing on a correspondingly-threaded portion of the worm-spindle.

In the arrangement shown in Figs. 6 to 9 the worm-spindle i is radial of the felly and the spindle of the worm a is transverse, the worm-wheel spindle i alone projecting into the groove of the wheel-rim d and having a pinion o fast upon it, said pinion o lying within the groove of the wheel-rim and entering longitudinal slots u v in the two overlapping ends s t of the band, each said slot having rack-teeth r along one edge only, those of the one being at the edge opposite to those of the other, and the pinion o gearing at diametrically opposite points with the two racks, which will thus be moved in opposite directions simultaneously by the revolution of the pinion. The pinion o is capped outwardly, as at w, to retain the ends of the band in gear with the pinion, and the spindle of the worm a is squared at the one end to receive the key by which it is rotated and is screw-threaded (preferably at the opposite end) to receive a screwed cap n, serving as a lock-nut, as before described.

It is to be understood that in applying the tire to the wheel the tire and the band or bands by which it is to be secured in the groove of the rim are lapped around the rim if the tire be made with an open joint, the ends of the elastic tire are forced apart, if necessary, by compressing the elastic tire in the circumferential direction, so as to give access to the band ends, which are respectively secured to the rim and engaged by the worm-wheel, and the band is then drawn tight after the ends of the tire have been brought together, so as to make a close butt-joint. The invention is not, however, limited to a tire or tire-cover having a joint. It may be applied to a tire or tire-cover having no joint, the tire or cover, or both, being simply sprung into position on the wheel-rim, care being taken to first insure the engagement of the worm-tightener with the rack or racks of the band before the remainder of the tire is sprung into position.

I claim—

1. The combination with an elastic tire having inwardly-projecting flanges, and with a band or bands adapted to encircle the wheel-rim and to clasp said flanges thereto, of a worm and worm-wheel gear mounted in the felly of the wheel-rim in such position that the end of the worm-spindle is presented for the application of a key and the worm-actuated worm-wheel geared with rack-teeth in the said band, so as by the revolution of the worm-gear to cause the band to be drawn tight around the wheel-rim so as to clasp the flanges of the tire firmly thereto as specified.

2. The combination with an elastic tire having inwardly-projecting flanges, and with a band or bands adapted to encircle the wheel-rim and to clasp said flanges thereto, of a worm and worm-wheel gear mounted in the felly of the wheel-rim in such position that the end of the worm-spindle is presented for the application of a key and the worm-actuated worm-wheel geared by means of teeth on the worm-wheel with rack-teeth in the said band, so as by the revolution of the worm-gear to cause the band to be drawn tight around the wheel-rim so as to clasp the flanges of the tire firmly thereto as specified.

3. The combination with an elastic tire having inwardly-projecting flanges, and with a band or bands adapted to encircle the wheel-rim and to clasp said flanges thereto, of a worm and worm-wheel gear mounted in the felly of the wheel-rim the worm-spindle being adapted to receive a key and the worm-wheel spindle being geared by means of a pinion on the said spindle with rack-teeth on the said band, the pinion gearing at opposite sides with oppositely-projecting rack-teeth at the opposite sides of longitudinal slots in the overlapping oppositely-directed ends of the band or bands so as by the revolution of the worm-gear and pinion to cause the said ends to be drawn simultaneously in opposite directions whereby to cause the band to be tightened about the wheel-rim and cause it to firmly clasp the flange of the tire thereto as specified.

4. The combination with the felly, a grooved rim, and an elastic tire having inwardly-projecting flanges lying in the groove of the rim, of a binding-band having one end secured to the rim, and provided with a rack at its other end, a worm-wheel mounted in the felly and meshing with the rack of the binding-band, and a worm also mounted in the felly and meshing with the worm-wheel, the spindle of the worm extending out through the felly and having its end constructed to receive a key, substantially as described.

5. The combination with a felly, a grooved rim, and an elastic tire having inwardly-projecting flanges lying in the groove of the rim, of a clamping-band, a worm-wheel mounted in the felly, means for clamping the band on the flanges of the tire from the worm-wheel, a worm also mounted in the felly and meshing with the worm-wheel, the outer end of the spindle of the worm being threaded and a cap screwing on the said spindle, substantially as and for the purpose set forth.

Dated the 20th day of November, 1900.

WILLIAM FREDERICK WILLIAMS.

Witnesses:
T. W. KENNARD,
C. J. CLARK.